(12) United States Patent
Gonzalez et al.

(10) Patent No.: US 8,950,519 B2
(45) Date of Patent: Feb. 10, 2015

(54) POLYCRYSTALLINE DIAMOND COMPACTS WITH PARTITIONED SUBSTRATE, POLYCRYSTALLINE DIAMOND TABLE, OR BOTH

(75) Inventors: Jair J. Gonzalez, Provo, UT (US); Kenneth E. Bertagnolli, Riverton, UT (US); Debkumar Mukhopadhyay, Sandy, UT (US); David P. Miess, Highland, UT (US); Mark P. Chapman, Provo, UT (US); Ronald W. Ward, Pleasant Grove, UT (US); Nicholas Christensen, Spanish Fork, UT (US); Damon B. Crockett, Mapleton, UT (US); Mohammad N. Sani, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 374 days.

(21) Appl. No.: 13/234,252

(22) Filed: Sep. 16, 2011

(65) Prior Publication Data

US 2014/0367176 A1 Dec. 18, 2014

Related U.S. Application Data

(63) Continuation-in-part of application No. 13/116,566, filed on May 26, 2011, and a continuation-in-part of application No. 13/166,007, filed on Jun. 22, 2011.

(51) Int. Cl.
*E21B 10/46* (2006.01)
(52) U.S. Cl.
USPC .......................................... 175/430; 175/434

(58) Field of Classification Search
USPC .................................................. 175/430, 434
See application file for complete search history.

(56) References Cited

U.S. PATENT DOCUMENTS

| | | | |
|---|---|---|---|
| 4,268,276 A | 5/1981 | Bovenkerk | |
| 4,322,390 A | 3/1982 | Tolley et al. | |
| T102,901 I4 | 4/1983 | Offenbacher | |
| 4,410,054 A | 10/1983 | Nagel et al. | |
| 4,468,138 A | 8/1984 | Nagel | |
| 4,560,014 A | 12/1985 | Geczy | |
| 4,629,373 A | 12/1986 | Hall | |
| 4,738,322 A | 4/1988 | Hall et al. | |
| 4,789,251 A | 12/1988 | McPherson et al. | |
| 4,811,801 A | 3/1989 | Salesky et al. | |

(Continued)

FOREIGN PATENT DOCUMENTS

EP 0543461 5/1993
JP H06-170571 6/1994

OTHER PUBLICATIONS

Davis, J.R. Editor, "Corrosion Behavior of Nickel and Nickel Alloys", Nickel, Cobalt, and Their Alloys, ASM Specialty Handbook, Jan. 1, 2000, pp. 157.

(Continued)

*Primary Examiner* — Jennifer H Gay
(74) *Attorney, Agent, or Firm* — Dorsey & Whitney LLP

(57) ABSTRACT

Methods for at least partially relieving stress within a polycrystalline diamond ("PCD") table of a polycrystalline diamond compact ("PDC") include partitioning the substrate of the PDC, the PCD table of the PDC, or both. Partitioning may be achieved through grinding, machining, laser cutting, electro-discharge machining, or combinations thereof. PDC embodiments may include at least one stress relieving partition.

33 Claims, 11 Drawing Sheets

(56) References Cited

U.S. PATENT DOCUMENTS

| | | | |
|---|---|---|---|
| 4,913,247 A | 4/1990 | Jones | |
| 4,951,762 A * | 8/1990 | Lundell | 175/420.1 |
| 4,984,642 A | 1/1991 | Renard et al. | |
| 4,993,505 A | 2/1991 | Packer et al. | |
| 5,016,718 A | 5/1991 | Tandberg | |
| 5,054,246 A * | 10/1991 | Phaal et al. | 451/540 |
| 5,092,687 A | 3/1992 | Hall | |
| 5,120,327 A | 6/1992 | Dennis | |
| 5,135,061 A | 8/1992 | Newton, Jr. | |
| 5,154,245 A | 10/1992 | Waldenstrom et al. | |
| 5,180,022 A | 1/1993 | Brady | |
| 5,267,398 A | 12/1993 | Hall | |
| 5,342,129 A | 8/1994 | Dennis et al. | |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,512,235 A | 4/1996 | Cerutti et al. | |
| 5,544,713 A | 8/1996 | Dennis | |
| 5,558,170 A * | 9/1996 | Thigpen et al. | 175/57 |
| 5,667,028 A * | 9/1997 | Truax et al. | 175/428 |
| 5,979,578 A * | 11/1999 | Packer | 175/432 |
| 6,135,219 A * | 10/2000 | Scott | 175/432 |
| 6,145,608 A | 11/2000 | Lund et al. | |
| 6,190,096 B1 * | 2/2001 | Arthur | 407/113 |
| 6,258,139 B1 | 7/2001 | Jensen | |
| 6,272,753 B2 * | 8/2001 | Packer | 76/108.2 |
| 6,419,034 B1 * | 7/2002 | Belnap et al. | 175/428 |
| 6,460,637 B1 * | 10/2002 | Siracki et al. | 175/430 |
| 6,793,681 B1 | 9/2004 | Pope et al. | |
| 7,108,598 B1 | 9/2006 | Galloway | |
| 7,152,701 B2 * | 12/2006 | Butland et al. | 175/334 |
| 7,316,279 B2 | 1/2008 | Wiseman et al. | |
| 7,533,740 B2 * | 5/2009 | Zhang et al. | 175/432 |
| 7,552,782 B1 | 6/2009 | Sexton et al. | |
| 7,559,695 B2 | 7/2009 | Sexton et al. | |
| 7,585,342 B2 * | 9/2009 | Cho | 51/309 |
| 7,608,333 B2 | 10/2009 | Eyre | |
| 7,670,406 B2 | 3/2010 | Belashchenko | |
| 7,703,982 B2 | 4/2010 | Cooley | |
| 7,866,418 B2 | 1/2011 | Bertagnolli et al. | |
| 7,870,913 B1 | 1/2011 | Sexton et al. | |
| 7,896,551 B2 | 3/2011 | Cooley et al. | |
| 7,901,137 B1 | 3/2011 | Peterson | |
| 7,946,768 B2 | 5/2011 | Cooley et al. | |
| 7,998,573 B2 | 8/2011 | Qian et al. | |
| 8,020,471 B2 | 9/2011 | Hall et al. | |
| 8,034,136 B2 | 10/2011 | Sani | |
| 8,147,142 B1 | 4/2012 | Peterson | |
| 8,157,029 B2 * | 4/2012 | Zhang et al. | 175/428 |
| 8,383,984 B2 | 2/2013 | Osako et al. | |
| 8,393,419 B1 * | 3/2013 | Burton | 175/426 |
| 8,534,391 B2 * | 9/2013 | Wirth | 175/426 |
| 2004/0007394 A1 * | 1/2004 | Griffin | 175/434 |
| 2004/0190804 A1 | 9/2004 | John et al. | |
| 2005/0077091 A1 * | 4/2005 | Butland et al. | 175/374 |
| 2005/0133277 A1 * | 6/2005 | Dixon | 175/426 |
| 2007/0034147 A1 | 2/2007 | Wort et al. | |
| 2007/0046119 A1 | 3/2007 | Cooley | |
| 2007/0187155 A1 | 8/2007 | Middlemiss | |
| 2009/0114628 A1 | 5/2009 | DiGiovanni | |
| 2009/0242525 A1 | 10/2009 | O'Brien et al. | |
| 2009/0260877 A1 * | 10/2009 | Wirth | 175/40 |
| 2010/0218995 A1 | 9/2010 | Sexton et al. | |
| 2010/0226759 A1 | 9/2010 | Cooley et al. | |
| 2010/0270088 A1 * | 10/2010 | Zhang et al. | 175/434 |
| 2010/0314176 A1 | 12/2010 | Zhang et al. | |
| 2011/0017520 A1 | 1/2011 | Webb | |
| 2011/0031036 A1 * | 2/2011 | Patel | 175/430 |
| 2011/0073379 A1 | 3/2011 | DiGiovanni et al. | |
| 2011/0174544 A1 | 7/2011 | Scott et al. | |
| 2012/0048626 A1 * | 3/2012 | Bellin | 175/430 |
| 2012/0175652 A1 | 7/2012 | Chyr et al. | |
| 2012/0281938 A1 | 11/2012 | Peterson et al. | |

OTHER PUBLICATIONS

Davis, J.R., Editor, "Failures from Various Mechanisms and Related Environmental Factors", Metals Handbook Desk Edition, Second Edition (ASM International), published Dec. 1998, pp. 1231-1232.
Smith International, Geodiamond, "Quick Cutter", available as of Nov. 9, 2010, (3 pages).
U.S. Appl. No. 13/116,566, filed Aug. 1, 2013, Office Action.
U.S. Appl. No. 13/432,224, filed Mar. 28, 2012, Peterson et al.
U.S. Appl. No. 11/545,929, filed Oct. 10, 2006, Bertagnolli.
U.S. Appl. No. 12/558,939, filed Sep. 14, 2009, Miess et al.
U.S. Appl. No. 12/961,787, filed Dec. 7, 2010, Mukhopadhyay et al.
U.S. Appl. No. 13/116,566, filed May 26, 2011, Miess.
U.S. Appl. No. 13/166,007, filed Jun. 22, 2011, Chapman et al.
Joseph, B., et al.—Liquid metal embrittlement: A state-of-the-art appraisal—The European Physical Journal Applied Physics, 1999.
Tze-Pin Lin, Michael Hood, George A. Cooper, and Redd H. Smith, Residual Stresses in Polycrystalline Diamond Compacts, J. Am. Ceram. Soc. 77[6] pp. 1562-1568 (1994).
Howes, "The Graphitzation of Diamond", 1962, Proc. Phys. Soc., vol. 80, pp. 648-662.
Pilkey, "Formulas for Stress, Strain, and Structural Matrices", 2005, John Wiley & Sons, 2nd Edition, pp. 255-305.
U.S. Appl. No. 13/166,007, mailed Oct. 23, 2013, Office Action.
U.S. Appl. No. 13/116,566, mailed Oct. 2, 2013, Office Action.
U.S. Appl. No. 13/116,566, mailed Mar. 26, 2014, Office Action.
U.S. Appl. No. 14/452,206, filed Aug. 5, 2014, Gonzalez et al.
International Search Report from International Application No. PCT/US2013/033324 mailed Aug. 30, 2013.
U.S. Appl. No. 13/116,566, mailed Jun. 9, 2014, Notice of Allowance.
U.S. Appl. No. 13/432,224, mailed Jul. 3, 2014, Office Action.
Written Opinion from International Application No. PCT/US2013/033324 mailed Aug. 30, 2013.
U.S. Appl. No. 13/166,007, mailed May 21, 2014, Office Action.
U.S. Appl. No. 14/481,592, filed Sep. 9, 2014, Miess.
U.S. Appl. No. 13/432,224, mailed Sep. 10, 2014, Office Action.
U.S. Appl. No. 13/116,566, mailed Oct. 1, 2014, Issue Notification.

\* cited by examiner

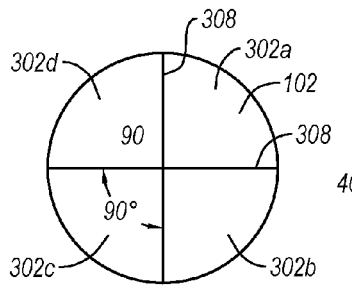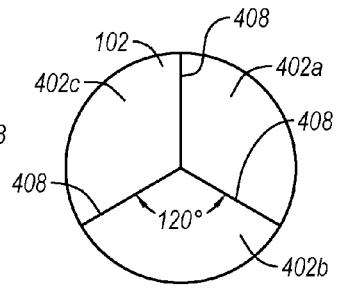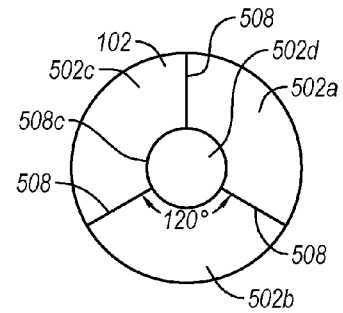
Fig. 4A          Fig. 4B          Fig. 4C
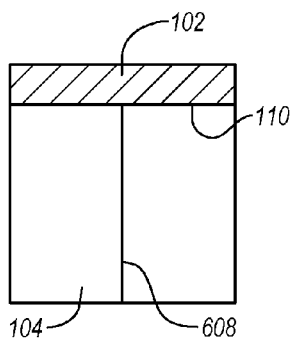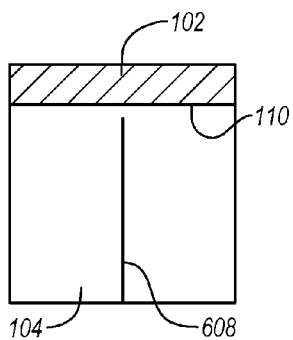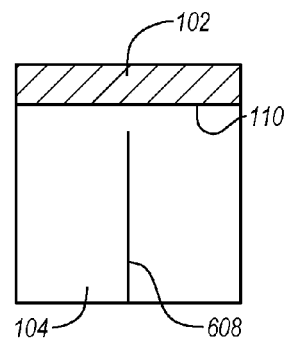
Fig. 5A          Fig. 5B          Fig. 5C
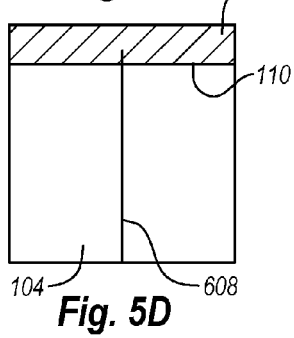
Fig. 5D

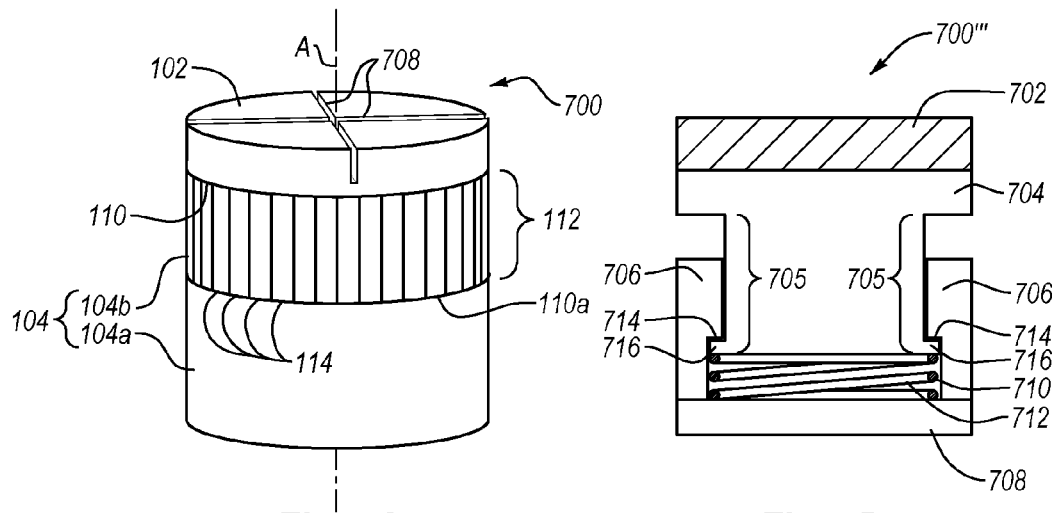
Fig. 7A
Fig. 7D
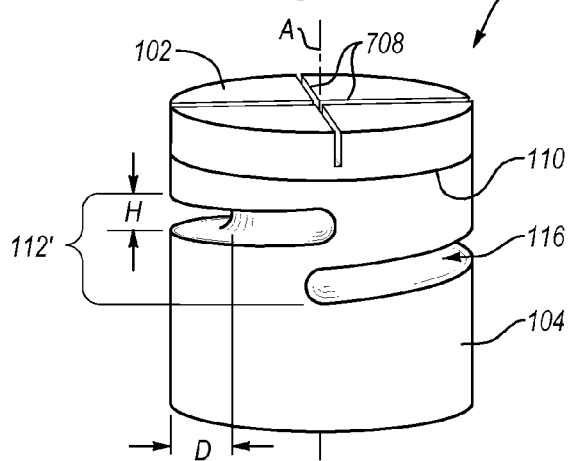
Fig. 7B
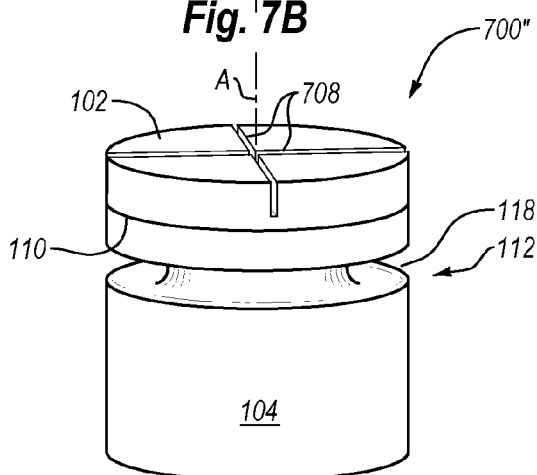
Fig. 7C

POLYCRYSTALLINE DIAMOND COMPACTS WITH PARTITIONED SUBSTRATE, POLYCRYSTALLINE DIAMOND TABLE, OR BOTH

CROSS REFERENCE TO RELATED APPLICATIONS

This application is a continuation-in-part of U.S. patent application Ser. No. 13/116,566 filed 26 May 2011 and entitled LIQUID-METAL-EMBRITTLEMENT RESISTANT SUPERABRASIVE COMPACT, AND RELATED DRILL BITS AND METHODS. This application is also a continuation-in-part of U.S. patent application Ser. No. 13/166,007 filed 22 Jun. 2011 and entitled METHOD FOR LASER CUTTING POLYCRYSTALLINE DIAMOND STRUCTURES. Each of the foregoing applications is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container or cartridge with a volume of diamond particles positioned on a surface of the cemented carbide substrate. A number of such cartridges may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst. Once the PCD table is formed, the solvent catalyst may be at least partially removed from the PCD table of the PDC by acid leaching.

SUMMARY

Various embodiments of the present invention are directed to methods of relieving residual stresses within a PCD table of a PDC. At least partial relief of such stresses reduces the tendency of the PCD table (which may be relatively brittle) to crack or otherwise fracture during use as a result of an impact or similar event. According to an embodiment of a method, a PDC including a PCD table bonded to a substrate (e.g., tungsten carbide or other carbide substrate) is provided. The PCD table includes a plurality of diamond grains that are bonded together. In order to at least partially relieve stress, the PCD table, the substrate, or both are partitioned (e.g., by EDM cutting, laser cutting, grinding, etc.).

Other embodiments are directed to associated PDCs that include a stress relieving partition formed into at least one of the substrate or PCD table. Such a PDC may include a substrate, a PCD table including a plurality of bonded diamond grains in which the PCD table is bonded to the substrate. The PCD table includes an exterior working surface and at least one lateral surface. At least one stress relieving partition is formed into at least one of the substrate or the PCD table to at least partially relieve stress within the PCD table.

The inventors have discovered that such partitioning of at least one of the PCD table or substrate decreases the residual stress within the PCD table, providing improved durability. In addition, partitioning of the PCD table provides a boundary that can stop propagation of a crack within the PCD table, should a crack form. Stopping progression of such a crack allows damage to be limited to and contained within one portion of the PCD table, preventing it from spreading to other portions across the partition.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIGS. 4A-4C are top plan views of PDCs similar to that shown in FIG. 3, but including different partition configurations according to various embodiments;

FIGS. 5A-5D are cross-sectional views of PDCs including a partition formed into the substrate and in which the respective partitioning cuts extend to different lengths relative to the location of an interface between the substrate and the PCD table according to various embodiments;

FIGS. 7A-7C are isometric views of various embodiments of PDCs including a spring mechanism formed into the substrate of the PDC in order to increase the ability of the adjacent PCD table to flex and absorb energy as a result of an impact;

FIG. 7D is a cross-sectional view of another embodiment of a PDC including a spring mechanism disposed within the substrate of the PDC;

DETAILED DESCRIPTION

I. Introduction

Embodiments of the present invention are directed to PDCs including a substrate, and a PCD table including a plurality of bonded diamond grains that is bonded to the substrate. The PCD table includes an exterior working surface and at least one lateral surface. At least one stress relieving partition is formed into the substrate, the PCD table, or both to at least partially relieve stress within the PCD table. At least partial relief of the residual stresses of the PCD table improves the overall durability of the PCD table. Further embodiments of the present invention are directed to related methods of fabricating such PDCs including one or more stress relieving partitions formed into the substrate, PCD table, or both.

II. PDC Embodiments

Figure 1:
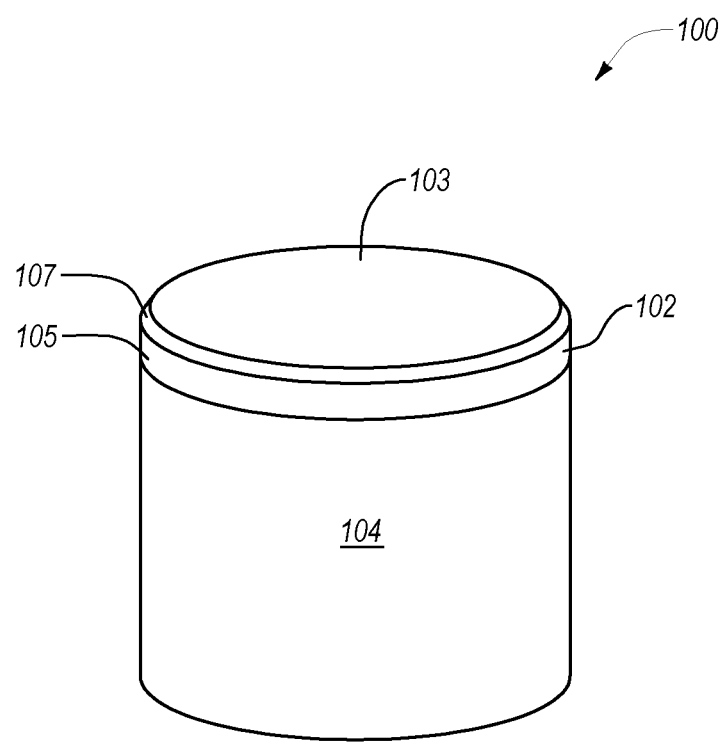
FIG. 1 is an isometric view of an example PDC.

The PCD elements partitioned for at least partial stress relief disclosed herein include PDCs fabricated according to one-step and two-step methods, as discussed in more detail hereinbelow. It may also be possible to form a partition into a freestanding PCD table or substrate, prior to final bonding of the two together. A one-step PDC may include a PCD table integrally formed and bonded to a cemented carbide substrate. The PCD table includes directly bonded-together diamond crystals exhibiting diamond-to-diamond bonding (e.g., $sp^3$ bonding) therebetween that define a plurality of interstitial regions. An example PDC 100 including a PCD table 102 and a cemented carbide substrate 104 is shown in FIG. 1. The PCD table 102 includes at least one lateral surface 105, an upper exterior working surface 103, and may include an optional chamfer 107 formed therebetween. It is noted that at least a portion of the at least one lateral surface 105 and/or the chamfer 107 may also function as a working surface (e.g., that contacts a subterranean formation during drilling operations).

A metal-solvent catalyst (e.g., iron, nickel, cobalt, or alloys thereof) is disposed in at least a portion of the interstitial regions between adjacent diamond crystals of PCD table 102. The cemented carbide substrate 104 may comprise tungsten carbide, tantalum carbide, vanadium carbide, niobium carbide, chromium carbide, titanium carbide, or combinations of the foregoing carbides cemented with iron, nickel, cobalt, or alloys of the foregoing metals. For example, the cemented carbide substrate may comprise cobalt-cemented tungsten carbide.

Generally, a one-step PDC may be formed by placing unbonded diamond particles adjacent to a cemented carbide substrate and subjecting the diamond particles and the cemented carbide substrate to an HPHT process under diamond stable HPHT conditions. During the HPHT process, metal-solvent catalyst from the cemented carbide substrate at least partially melts and sweeps into interstitial regions between the diamond crystals to catalyze growth of diamond and formation of diamond-to-diamond bonding between adjacent diamond particles so that a PCD table is formed that bonds to the cemented carbide substrate upon cooling from the HPHT process.

A two-step PDC may also be formed in which an at least partially leached PCD table (i.e., a freestanding PCD table) may be placed adjacent to a cemented carbide substrate and subjected to an HPHT process under diamond stable conditions. During the HPHT process, an infiltrant from the cemented carbide substrate infiltrates into the interstitial regions of the at least partially leached PCD table and bonds the infiltrated PCD table to the cemented carbide substrate upon cooling from the HPHT process.

In an embodiment, the at least partially leached PCD table may be formed by separating the PCD table from a one-step PDC by removing the cemented carbide substrate via any suitable process (e.g., grinding, machining, laser cutting, EDM cutting, or combinations thereof). The metal-solvent catalyst present within the PCD table may be leached from the PCD table in a suitable acid. In another embodiment, the at least partially leached PCD table may be formed by other methods, such as sintering diamond particles in the presence of a metal-solvent catalyst to form a PCD table or disk and leaching the PCD table in a suitable acid.

After bonding to a final substrate, both one-step and two-step PDCs may be subjected to a leaching process to remove a portion of the metal-solvent catalyst or infiltrant from the PCD table to a selected depth and from one or more exterior surfaces. Removal of the metal-solvent catalyst or infiltrant may help improve thermal stability and/or wear resistance of the PCD table during use.

Examples of acids used in leaching include, but are not limited to, aqua regia, nitric acid, hydrofluoric acid, and mixtures thereof. For example, leaching the PCD table 102 may form a leached region that extends inwardly from the exterior surface 103, the lateral surface 105, and the chamfer 107 to a selected leached depth. Such a selected leached depth may be about 100 μm to about 1000 μm, about 100 μm to about 300 μm, about 300 μm to about 425 μm, about 350 μm to about 400 μm, about 350 μm to about 375 μm, about 375 μm to about 400 μm, about 500 μm to about 650 μm, or about 650 μm to about 800 μm.

The bonded together diamond grains of the PCD table may exhibit an average grain size of about 100 μm or less, about 40 μm or less, such as about 30 μm or less, about 25 μm or less, or about 20 μm or less. For example, the average grain size of the diamond grains may be about 10 μm to about 18 μm, about 8 μm to about 15 μm, about 9 μm to about 12 μm, or about 15 μm to about 25 μm. In some embodiments, the average grain size of the diamond grains may be about 10 μm or less, such as about 2 μm to about 5 μm or submicron.

The diamond particle size distribution of the diamond particles may exhibit a single mode, or may be a bimodal or greater grain size distribution. In an embodiment, the diamond particles of the one or more layers of diamond particles may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger average particle size (e.g., 50 μm, 40 μm, 30 μm, 20 μm, 15 μm, 12 μm, 10 μm, 8 μm) and another portion exhibiting at least one relatively smaller average particle size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger average particle size between about 10 μm and about 40 μm and another portion exhibiting a relatively smaller average particle size between about 1 μm and 4 μm. In some embodiments, the diamond particles may comprise three or more different average particle sizes (e.g., one relatively larger average particle size and two or more relatively smaller average particle sizes), without limitation.

It is noted that the as-sintered diamond grain size may differ from the average particle size of the diamond particles prior to sintering due to a variety of different physical processes, such as grain growth, diamond particles fracturing, carbon provided from another carbon source (e.g., dissolved carbon in the metal-solvent catalyst), or combinations of the foregoing.

The PCD table 102 may exhibit a thickness of at least about 0.040 inch, such as about 0.045 inch to about 1 inch, about 0.045 inch to about 0.500 inch, about 0.050 inch to about 0.200 inch, about 0.065 inch to about 0.100 inch, or about 0.070 inch to about 0.100 inch (e.g., about 0.09 inch).

As described above, the PCD table 102 may be formed separately from or integral with the substrate 104 in an HPHT process. When formed separately, the PCD table 102 may be subsequently attached to the substrate 104 in another HPHT process (i.e., the PCD is fabricated in a two-step process). The temperature of such HPHT processes may typically be at least about 1000° C. (e.g., about 1200° C. to about 1600° C.) and the pressure of the HPHT process may typically be at least about 4.0 GPa (e.g., about 5.0 GPa to about 12.0 GPa, about 7.0 GPa to about 9.0 GPa, about 6.0 GPa to about 8.0 GPa, or about 9.0 GPa to about 12.0 GPa). Techniques for brazing the PCD table to the substrate are disclosed in U.S. application Ser. No. 11/545,929, which incorporated by reference below.

Additional details of examples of one-step and two-step processes for fabricating a PDC are disclosed in U.S. application Ser. No. 12/961,787 filed 7 Dec. 2010; U.S. application Ser. No. 11/545,929 filed 10 Oct. 2006; and U.S. Pat. No. 7,866,418 issued on 11 Jan. 2011, both of which are incorporated herein, in their entirety, by this reference. Any PDC or PCD table disclosed in U.S. application Ser. No. 12/961,787; U.S. application Ser. No. 11/545,929; and U.S. Pat. No. 7,866,418 may be used as the initial PDC or PCD table that is partitioned.

III. Embodiments of Partitioned PDCs and Fabrication Methods

Figure 2:
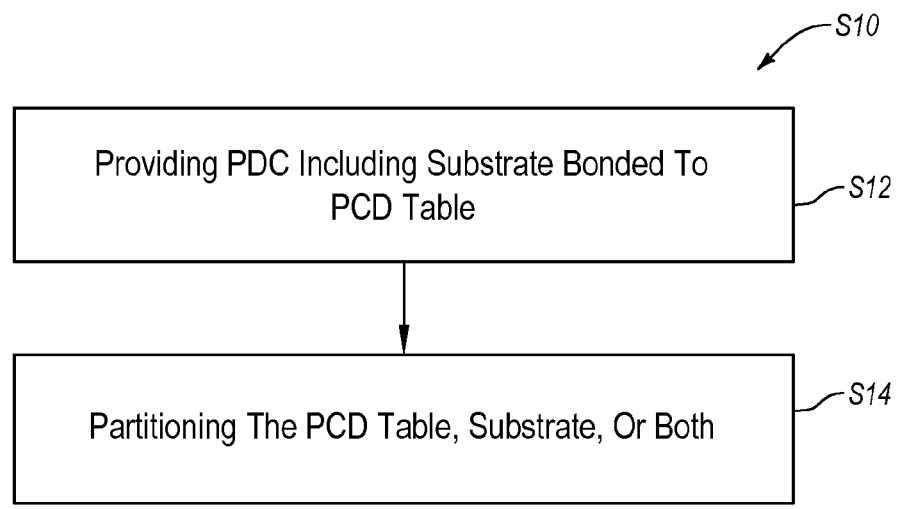
FIG. 2 is a flow diagram describing an embodiment of a method for partitioning a substrate, PCD table, or both of a PDC in order to relieve residual stresses within the PCD table.

FIG. 2 shows a flow diagram generally describing an embodiment of a method S10 for at least partially relieving residual stresses within a PCD table of the PDC. At S12, a PDC including a PCD table bonded to a substrate is provided. The PCD table includes a plurality of diamond grains that are bonded together. The PDC may be similar to that shown in FIG. 1. Because of differences between the coefficient of thermal expansion ("CTE") of the substrate relative to that of the PCD table, inherent residual stresses are present within the PDC structure. At least a portion of the residual stresses can be relieved by forming a partition (e.g., a cut) into the PCD table, the substrate, or both. At S14, such a partition is formed into the PCD table, the substrate or both. The modified PDC including one or more partitions exhibits a decreased level of residual stress within the PCD table, which may improve the durability and usability of the PDC, even if it is damaged during use. For example, the partition can arrest or direct propagation of a crack in the PCD table at the partition should a crack form during use.

Figure 3:
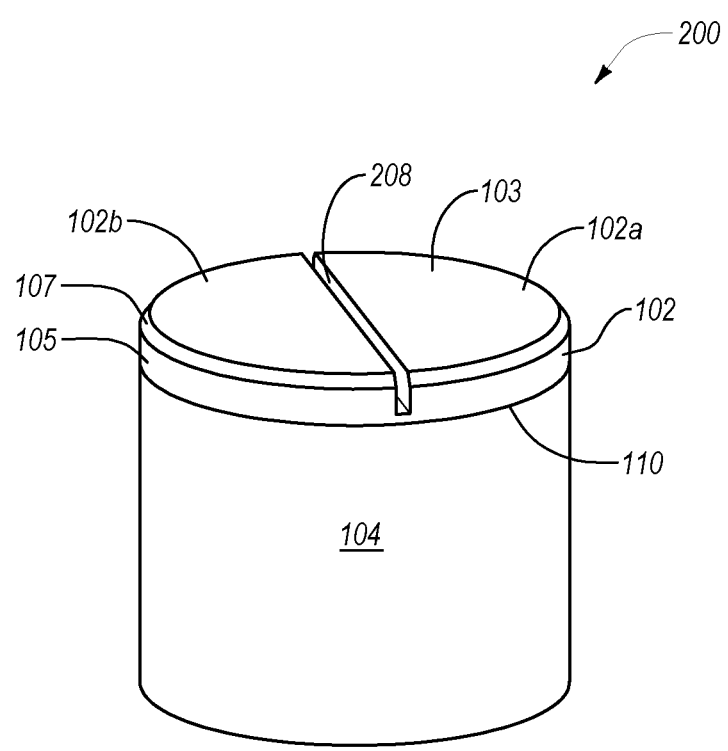
FIG. 3 is an isometric view of a PDC including a partitioning cut formed into the PCD table according to an embodiment.

FIG. 3 is an isometric view of a PDC 200 including a partition 208 formed into PCD table 102. The partitioning cut 208 is shown as being generally aligned with a diameter of the PCD table 102, partitioning table 102 into two substantially equal portions 102a and 102b. The partitioning cut 208 is shown as extending nearly to interface 110 between the substrate 104 and the PCD table 102 (e.g., leaving a PDC table thickness of less than about 0.1 inch). The partitioning cut 208 may be disposed entirely within PCD table 102 (as shown), may extend to the interface 110, or may even extend somewhat past the interface 110 into the substrate 104.

Figure 3A:
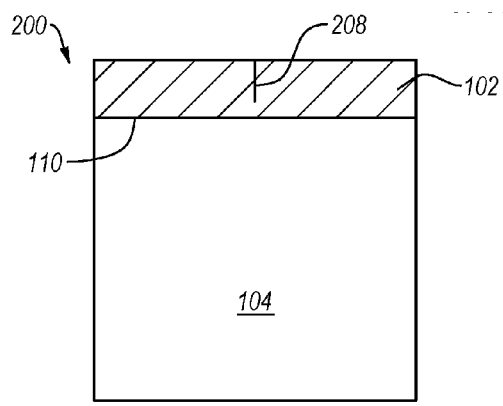
FIGS. 3A-3C are cross-sectional views of PDCs including a partition formed into the PCD table and in which the respective partitioning cuts extend to different lengths relative to the location of an interface between the PCD table and the substrate according to various embodiments.

Extension of the partitioning cut 208 beyond the interface 110 may be beneficial where the PCD table 102 has been sintered with the substrate 104 to at least partially relieve stresses associated with a zone of the substrate 104 adjacent interface 110 that is depleted of metal-solvent catalyst relative to adjacent deeper portions of the substrate 104. The metal-solvent catalyst depletion zone may be more brittle than adjacent regions in the substrate including higher cobalt or other metal solvent catalyst levels. As a result, the cut 208 may advantageously extend into or past such a depletion zone. For example, during sintering and bonding, a metal-solvent catalyst or infiltrant is swept into the region of the PCD table 102, thereby depleting a portion of the substrate 104 of cobalt or other metal-solvent catalyst/infiltrant that is disposed adjacent to the interface 110. The partitioning cut 208 may be extended into a depletion zone or past this zone of the substrate 104 to better relieve stresses resulting from the presence of the depleted zone adjacent the PCD table 102.

Where the partitioning cut 208 extends short of the interface 110 (so as to be entirely disposed within PCD table 102), the partitioning cut 208 may leave a PCD table thickness between greater than 0 and about 0.1 inch, between about 0.005 inch and about 0.07 inch, or between about 0.05 inch and about 0.1 inch. FIG. 3A shows an embodiment in which the portioning cut 208 is entirely disposed within the PCD table 102, leaving a PCD thickness as described above. FIG. 3B shows an embodiment in which the portioning cut 208 extends to the interface 110. FIG. 3C shows an embodiment in which the portioning cut 208 extends beyond the interface 110, into the substrate 104.

Where the partitioning cut 208 extends through PCD table 102 and into substrate 104 (e.g., into or even deeper than a depletion zone), the partitioning cut 208 may extend between greater than 0 and about 0.1 inch into substrate 104, between about 0.005 inch and about 0.07 inch into substrate 104, or between about 0.008 inch and about 0.1 inch into substrate 104. In an embodiment, a depletion zone may typically extend to a depth between about 0.008 inch to about 0.05 inch.

The width of partitioning cut 208 may be of any desired value. In one embodiment, the partitioning cut 208 may be formed by EDM or laser cutting. The width of the partitioning cut 208 may be about 0.001 inch to about 0.2 inch, about 0.005 inch to about 0.05 inch, about 0.01 inch to about 0.1 inch, about 0.0001 to about 0.001 inch, or less than about 0.001 inch.

Figure 3D:
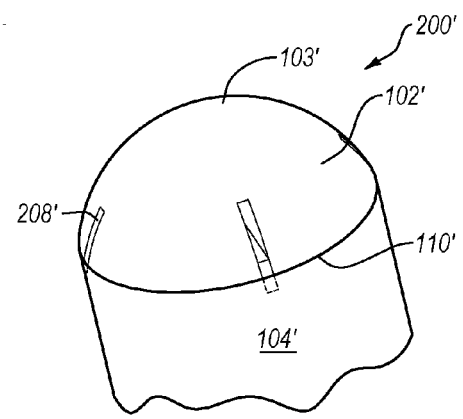
FIG. 3D is an isometric view of a PDC including a domed PCD layer including partitioning cuts formed into the domed PCD table.
Figure 3B:
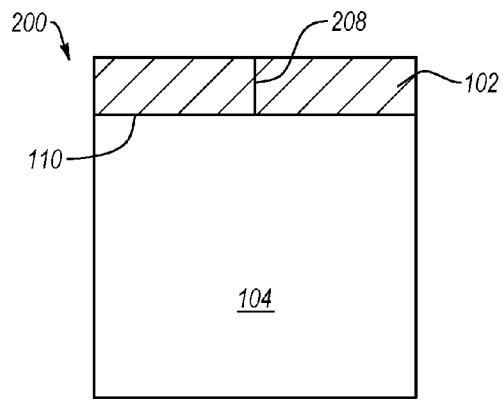
Figure 3C:
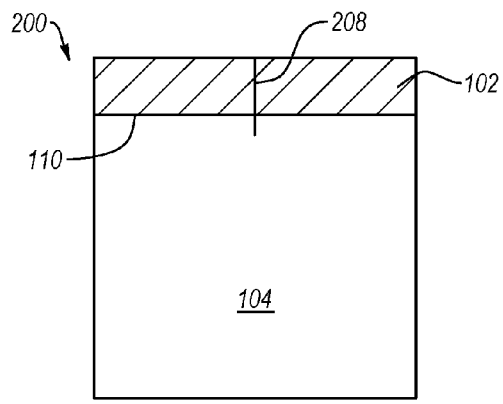

FIG. 3D is an isometric view of a PDC 200' including a substrate 104' bonded to a PCD layer 102' with a convexly-curved top working surface 103'. As with the illustrated planar PCD table configurations, the substrate, PCD layer, or both of such a PDC may be partitioned to at least partially relieve stresses. In an embodiment, a plurality of partitioning cuts 208' may be formed about a periphery of the PCD layer 102' proximate to the interface surface 110' between the PCD layer 102' and the substrate 104'. Such domed or otherwise curved PCD layers may particularly benefit from partitioning, as such PDCs may exhibit greater internal stresses than planar PCD tables, which can lead to delamination or other premature failure of the PCD layer. As illustrated, the partitioning cuts 208' may be formed into the convexly-curved top working surface 103' of the PCD layer 102'. For example, the one or more partitioning cuts 208' may terminate at the interfacial surface 110' or may extend beyond the interfacial surface 110' into the substrate 104' (shown with the broken lines).

FIGS. 4A-4C illustrate top plan views of various embodiments of configurations by which PCD table 102 may be partitioned. FIG. 3 illustrates an embodiment where a single partitioning cut 208 divides the PCD table 102 into the two portions 102a, 102b. FIG. 4A illustrates an embodiment where the PCD table 102 is partitioned into four substantially equal portions 302a-302d. Two partitioning cuts 308 may be formed in a top surface of PCD table 102, along the diameter of PCD table 102 so as to intersect substantially perpendicularly. FIG. 4B illustrates an embodiment where the PCD table 102 is partitioned into three substantially equal portions 402a-402c where three partitioning cuts 408 are spaced about 120° apart. Each cut 408 is located at a radius of PCD table 102, each spaced about 120° apart. FIG. 4C shows another embodiment similar to that of FIG. 4B, but in which a central generally circular partitioning cut 508c is also formed. The radius partitioning cuts 508 do not extend to the center of PCD table 102, but end at the intersection with central generally circular cut 508c. The generally circular partitioning cut 508c defines a central portion 502d, while the other partitioning cuts 508 further define boundaries of portions the 502a-502c. As described above, partitioning of the PCD table 102 may extend short of the interface 110, to the interface 110, or beyond the interface 110 and into the substrate 104 (e.g., past a depleted zone). In an embodiment, the PCD table may be completely partitioned (e.g., the cuts may extend to the interface 110), and the PCD table may subsequently be bonded back together (e.g., by HPHT processing with an associated substrate). Alternative partitioning configurations are possible, e.g., along various radius positions similar to the embodiment shown in FIG. 3D. For example, the partitioning cut(s) may not be disposed along a radius or diameter, but offset so as to divide the partitioned component into portions of any desired size or shape. The illustrated configurations are only embodiments, and various other partitioning configurations may be employed.

FIGS. 5A-5C illustrate cross-sectional views of various configurations by which the substrate of PDC 100 may be partitioned. The substrate may be partitioned in any configuration desired, for example, similar to the two, three, or four portions shown with respect to partitioning of PCD table 102 in FIGS. 3 and 4A-4C. Of course, other partitioning configurations will also be apparent to one of skill in the art. As with partitioning the PCD table 102, partitioning of the substrate 104 may extend to the interface 110, short of the interface 110, or extend past interface the 110 (i.e., into the PCD table 102). FIG. 5A shows a partitioning cut 608 of the substrate 104 terminating generally at the interface 110 between the substrate 104 and the PCD table 102 according to an embodiment. FIGS. 5B and 5C both show configurations in which the partitioning cut 608 terminates short of the interface 110 so that the entirety of the partitioning cut 608 is disposed within substrate the 104 according to an embodiment. FIG. 5D shows an example in which partitioning cut 608 extends beyond the interface 110, into the PCD table 102. In addition, although the interface 110 is shown in the various Figures as being generally planar, this is not required. For example, the interface 110 may be non-planar (e.g., curved, having a plurality of projections, having a plurality of recesses, or combinations of the foregoing), or may provide for varying thickness of the adjacent substrate, PCD table, or both. Of course, additional partitioning cuts may be formed in the PCD table 102, if desired (e.g., as shown in FIGS. 3 and 4A-4C), so that both the substrate and PCD table are partitioned. Furthermore, when partitioning the exterior surfaces of both the substrate 104 and the PCD table 102, the partitions may be offset relative to one another so as to not intersect one another for increased strength.

Where the partitioning cut 608 extends short of the interface 110 so as to be entirely disposed within substrate 104, the partitioning cut 608 may leave a substrate thickness between about 0 and about 0.1 inch, between about 0.005 inch and about 0.07 inch, or between about 0.05 inch and about 0.1 inch. By way of example, FIG. 5B may represent a partitioning cut 608 that extends to within about 0.01 inch (e.g., about 0.01 inch or less) from the interface 110. FIG. 5C may represent a partitioning cut 608 that extends to within about 0.05 inch (e.g., about 0.05 inch or less) from the interface 110.

The partitioning cuts may be formed by any suitable technique, including, but not limited to, grinding, machining, laser cutting, electro-discharge machining ("EDM"), combinations thereof, or other suitable technique. Suitable EDM techniques includes plunge EDM, wire EDM, or combinations thereof, without limitation. The foregoing material removal techniques remove a selected amount of material from the substrate 104, the PCD table 102, or both, to form the portioning cut with a desired depth and width. Typical widths for the partitioning cut 608 may be about 0.001 inch to about 0.2 inch, about 0.005 inch to about 0.05 inch, about 0.01 inch to about 0.1 inch, about 0.0001 to about 0.001 inch, or less than about 0.001 inch. When partitioning a PCD table that has been leached, it may be desirable to form the partitioning cuts by laser cutting, which does not require that the PCD table be electrically conductive. Additional details relative to laser cutting embodiments are disclosed in U.S. patent application Ser. No. 13/166,007 filed Jun. 22, 2011 and entitled METHOD FOR LASER CUTTING POLYCRYSTALLINE DIAMOND STRUCTURES, which is incorporated herein, in its entirety, by this reference.

Figure 6:
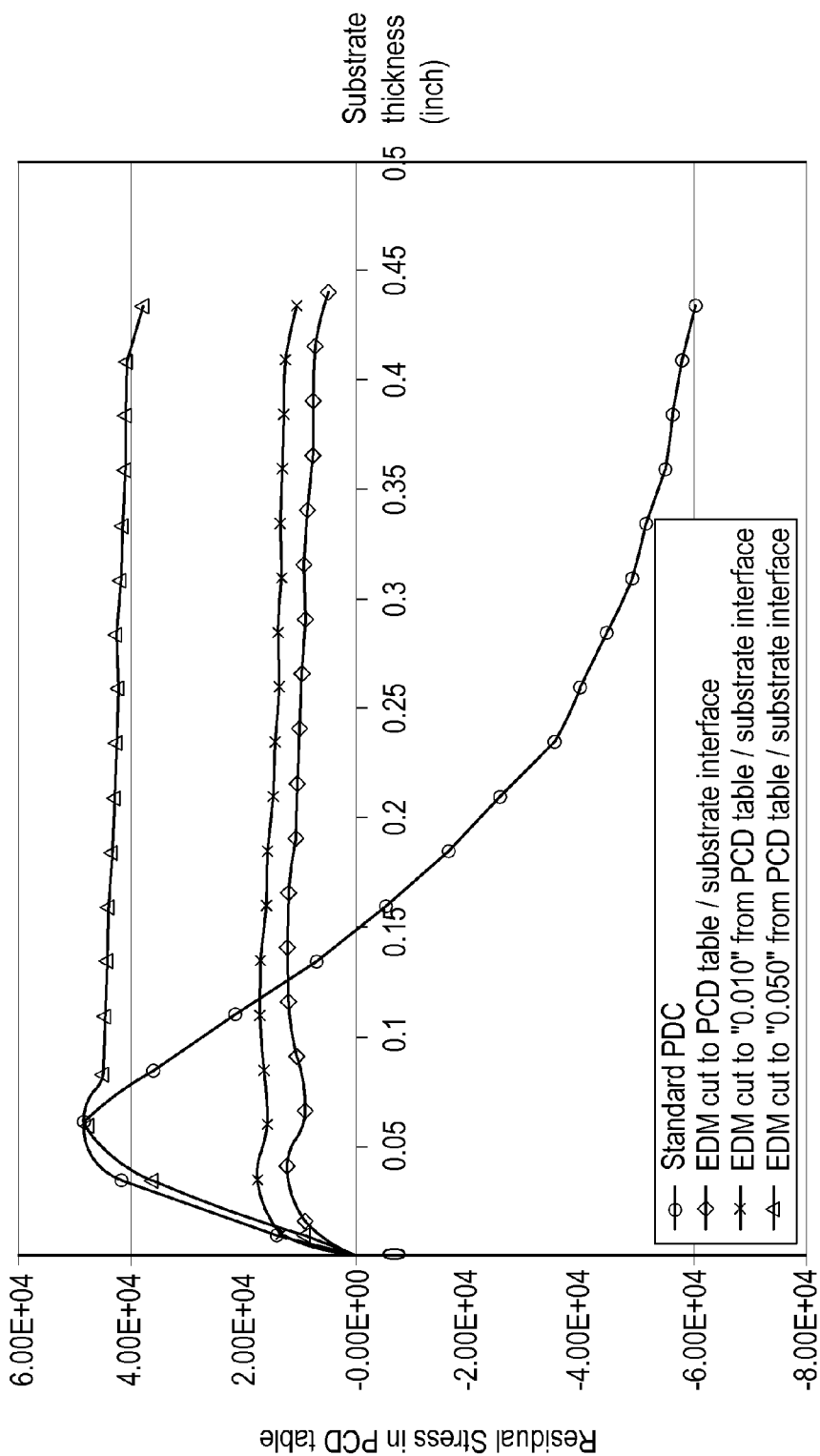
FIG. 6 is a graph showing residual stresses for PCD tables as a result of various partitioning configurations.

FIG. 6 shows actual testing data associated with partitioning cuts 608 similar to those shown in FIGS. 5A-5C, in which the substrate is partitioned. As shown, a standard PDC including no partitioning cuts exhibits residual stress values within the PCD table that are quite variable depending on the thickness of the substrate. The residual stress data is calculated by measuring the strain relieved in the PCD table as the substrate is progressively ground away. Stress may be calculated from the measured relieved strain values assuming a modulus of elasticity (E) of $1.24 \times 10^8$ psi and a Poisson's ratio (v) of 0.23 for the PCD table. Such a technique is described in Lin, T. P., Hood, M., Cooper, G. A., & Smith, R. H. (1994). Residual stresses in polycrystalline diamond compacts. *Journal of the American Ceramic Society,* 77, 1562-1568, which is incorporated herein, in its entirety, by this reference. For example, in a conventional PDC without partitioning (e.g., the PDC 100 of FIG. 1) a peak tensile residual stress within the PCD table of about $5.00 \times 10^4$ psi is found at a substrate thickness of about 0.06 inch. As the substrate thickness increases, the residual stress values drop, eventually reaching a maximum compressive residual stress of about $6.00 \times 10^4$ psi.

When the substrate is partitioned (e.g., as shown in FIG. 5A) generally to the PCD table-substrate interface, the residual stress profile as a function of substrate thickness is very different from the standard PDC. The residual stress is tensile in character no matter the thickness of the substrate, and is relatively constant, remaining between about $0.5 \times 10^4$ psi to about $1 \times 10^4$ psi. When the substrate is partitioned (e.g., as shown in FIG. 5B) to a distance about 0.01 inch from the PCD table-substrate interface, the residual stress profile is similar, although somewhat higher. The residual stress is tensile in character no matter the substrate thickness, and is relatively constant, remaining between about $1 \times 10^4$ psi to about $1.75 \times 10^4$ psi. When the substrate is partitioned (e.g., as shown in FIG. 5C) to a distance about 0.05 inch from the PCD table-substrate interface, the residual stress profile is again similar, although higher still. The residual stress is still tensile in character no matter the substrate thickness, and is relatively constant, remaining between about $4 \times 10^4$ psi to about $4.5 \times 10^4$ psi.

As shown in FIGS. 7A-7C, some embodiments may further include a spring mechanism 112 within substrate 104 to allow the adjacent PCD table 102 to flex and better absorb energy as a result of an impact. Various spring mechanisms 112 may be formed into substrate 104 by removal of select portions of substrate 104. FIG. 7A shows an embodiment of a PDC 700 including a PCD table 102 that has been partitioned by two substantially perpendicular diameter cuts 708 (i.e., similar to that shown in FIG. 4A). A substrate 104 is bonded to the PCD table 102 at the interface 110. The spring mechanism 112 includes a plurality of generally longitudinally extending (i.e., vertical in the orientation of FIG. 7A) relief cuts 114, which may be similar to partitioning cuts 608 described above. Such relief cuts 114 may typically not extend the full width of substrate 104, but be formed in an outer peripheral surface and extend partially into the substrate 104 to a selected depth. While such relief cuts 114 may also provide stress relief as described above relative to the partitioning cuts 608, the relief cuts 114 may provide a spring mechanism within the substrate 104 for improved impact resistance for the PCD table 102. The cuts 114 may be formed to any desired depth, and may extend towards the center of PDC 100, defined along longitudinal axis A (e.g., cuts 114 may be formed along radius lines extending outward from axis A). According to an embodiment, formation of the spring mechanism 112 may be accomplished by bonding a solid backup substrate portion to a partitioned substrate portion. Providing a solid backup substrate portion may add strength to the substrate and may be formed from any of the cemented carbide materials disclosed herein. FIG. 7A illustrates one such embodiment, where the the substrate 104 includes a solid backup bottom portion 104a and a partitioned top portion 104b. The two portions 104a and 104b may be bonded together along interface 110a via brazing, diffusion bonding, or an HPHT bonding process.

FIG. 7B shows another embodiment of a configuration 700' similar to the PDC 700 shown in FIG. 7A, but in which the spring mechanism 112' comprises a helically extending groove 116 extending around a periphery (e.g., a circumference) of the substrate 104. The height "H" and depth "D" of the helical groove 116 may be selected depending on desired spring characteristics. For example, the depth "D" may be about 0.01 to about 0.5 times a diameter or other lateral dimension of the PDC 700', such as about 0.02 cm to about 1 cm, or about 0.6 cm to about 0.8 cm. The height "H" may be about 0.001 inch to about 0.2 inch, about 0.005 inch to about 0.05 inch, or about 0.01 inch to about 0.1 inch. FIG. 7C shows another embodiment of a configuration 700" similar to the PDC 100 shown in FIG. 7B, but in which the spring mechanism 112" comprises a groove 118 that is not helical, but extends around the substrate 104 at a substantially constant distance from the interface 110.

As seen in FIGS. 7A-7C, the spring mechanism may be provided adjacent to the interface 110. The spring mechanism may extend substantially the full height of the substrate 104, or (as shown), may be disposed within only a "top" portion of the substrate 104, adjacent to the interface 110 so as to be disposed in close proximity to the PCD table 102.

In each case, the disclosed spring mechanism 112 provides an improved ability for the adjacent PDC table 102 to flex and absorb energy as a result of an impact. In other words, a given impact that would result in fracture of the PCD table of a PDC (e.g., such as that shown in FIG. 1) that does not include a spring mechanism may comparatively exhibit a different outcome when a spring mechanism (e.g., as shown in FIGS. 7A-7C) is included in the substrate 104. As compared to the standard PDC, a PDC as shown in FIGS. 7A-7C may be expected to exhibit less of a tendency for the PCD table to fracture when subjected to a given impact. As such, the PDCs and PCD tables may exhibit increased durability. Such configurations may be particularly beneficial for drilling applications when encountering a hard rock formation. It may also be beneficial with impact loading.

In some embodiments, a compliant material (e.g., a rubber or other polymer such as silicone or a thermoplastic elastomer) may be disposed within the groove to provide a selected stiffness to the spring mechanism.

Providing both partitioning of the PCD table and a spring mechanism as shown in FIGS. 7A-7C may be particularly beneficial, as the partitioning of the PCD table 102 at least partially relieves stresses within the PCD table as shown in FIG. 6, while also limiting any damage to a PCD table to the portion in which the crack first appears. In other words, the crack may be able to propagate to the partition cut defining the boundary of the particular PCD table portion, but its progress may be arrested at this point by the presence of the partitioning cut. In addition, providing a spring mechanism as shown in FIGS. 7A-7C provides additional durability to inhibit a crack from forming in the first place, as the impact can be at least somewhat absorbed by the spring mechanism and the ability of the above PCD table to flex. Thus, a crack is less likely to form in the first instance, and if a crack does form (as the result of a relatively large magnitude impact), the damage caused by the crack may be limited to the portion in which it forms or directed along the partitioning cut.

Of course, it will be understood that a spring mechanism for improving impact resistance of the PCD table may be provided independently of any partitioning of the PCD table or substrate. For example, a spring mechanism may be provided where no partitioning is provided in the PCD table 102 or substrate 104. FIG. 7D illustrates one such PDC 700''' including a PCD table 702 bonded to a substrate 704. A bottom portion of substrate 704 may be received within a cavity 710 defined by a substrate sleeve portion 706. The substrate sleeve portion 706 may include a base portion 708 with a spring mechanism 712 disposed within the cavity 710.

For example, the spring mechanism 712 may be a compression spring and/or other biasing element such as a resilient material.

As illustrated, the substrate portions 704 and 706 may provide a generally flush periphery at their interface when the spring mechanism 712 is compressed. The lower portion 705 of the substrate portion 704 may be laterally smaller than the adjacent upper section of the substrate portion 704 so that the lower portion 705 may be received within the cavity 710 of the sleeve portion 706 of the substrate 704. The internal surface of the sleeve portion 706 may include a flange surface 714 that is configured to abut against an oppositely disposed flange 716. Abutment between the flanges 714 and 716 provides a stop, which limits how far substrate portion 704 can be biased upwards by the spring mechanism 712. Although no partitioning cuts are shown in PCD table 702 or the substrate portion 704, such cuts may optionally be provided. Similarly, any of the embodiments shown in FIGS. 7A-7C may have the partitioning cuts formed in the PCD table 102 omitted.

IV. Applications of Products Including PDCs

The PDCs including features and/or formed according to the various embodiments disclosed herein may be used as PDC cutting elements on a rotary drill bit, within thrust bearing assemblies, rotary bearing assemblies, and other applications. For example, in a method according to an embodiment of the invention, one or more PDCs that have been partitioned according to any of the disclosed embodiments may be attached to a bit body of a rotary drill bit, brazed or otherwise joined into a bearing assembly, or otherwise incorporated into a desired product. In one embodiment, partitioning cuts formed into the substrate may be at least partially filled with braze alloy or other material, e.g., when brazing or otherwise joining the PDC into a bearing assembly or other product.

Figure 8:
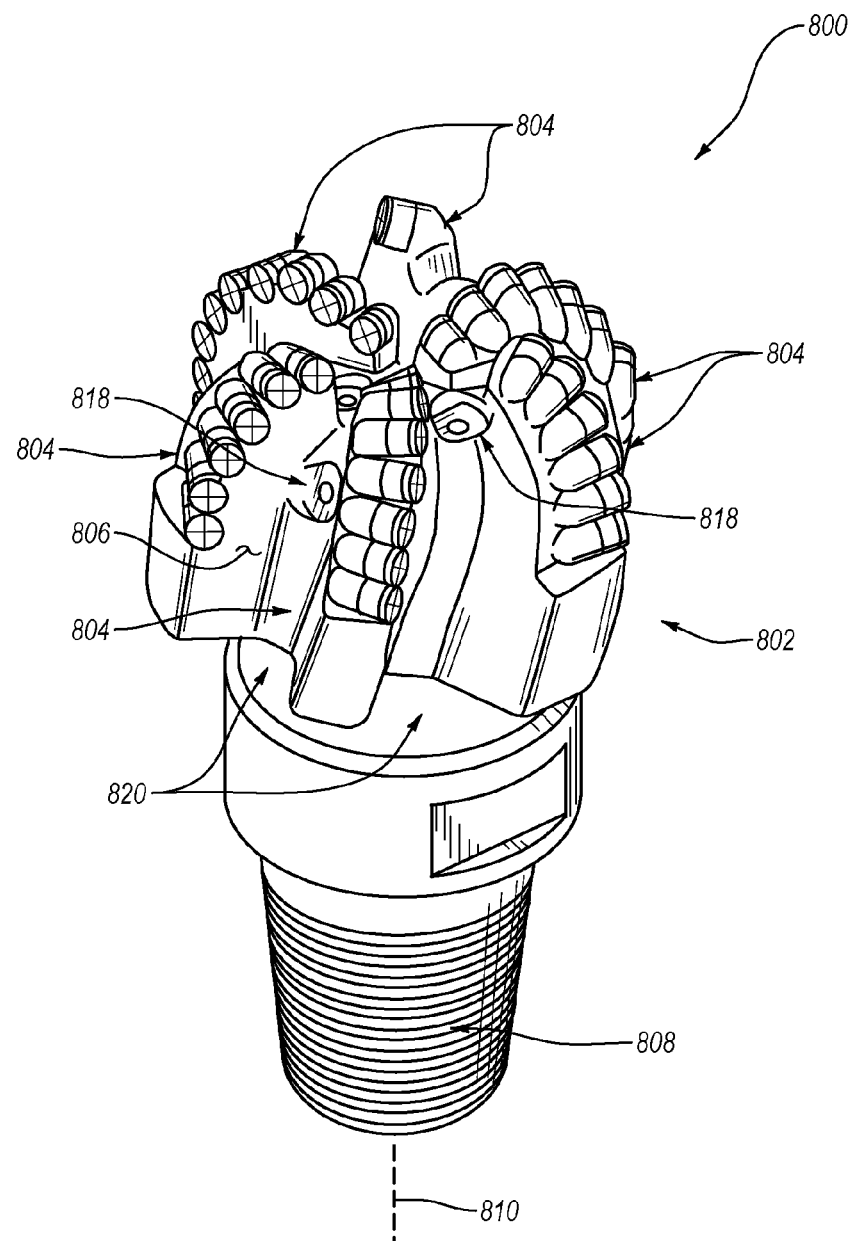
FIG. 8 is an isometric view of an embodiment of a rotary drill bit that may employ one or more PDCs according to any of the disclosed embodiments.
Figure 9:
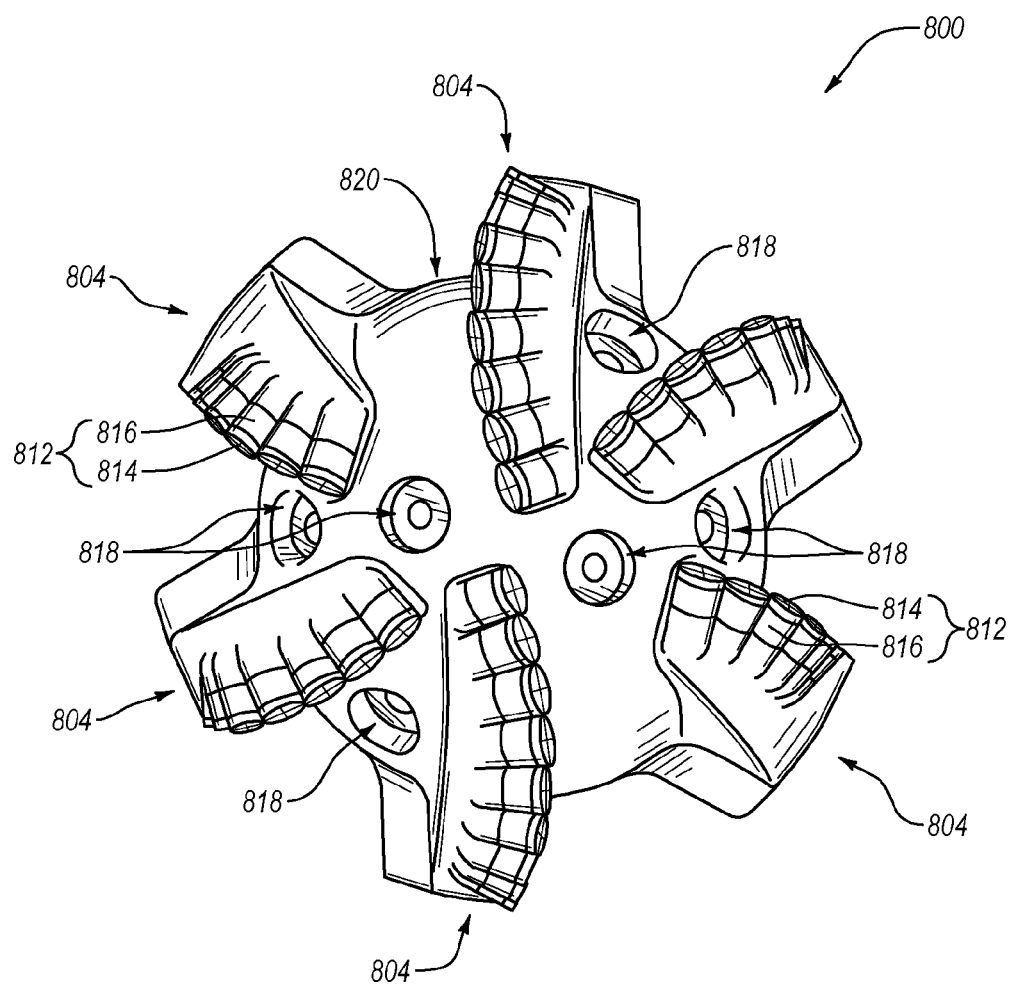
FIG. 9 is a top elevation view of the rotary drill bit shown in FIG. 8.

FIG. 8 is an isometric view and FIG. 9 is a top elevation view of an embodiment of a rotary drill bit 800 that includes at least one PDC configured and/or fabricated according to any of the disclosed PDC embodiments. The rotary drill bit 800 comprises a bit body 802 that includes radially and longitudinally extending blades 804 having leading faces 806, and a threaded pin connection 808 for connecting the bit body 802 to a drilling string. The bit body 802 defines a leading end structure for drilling into a subterranean formation by rotation about a longitudinal axis 810 and application of weight-on-bit. At least one PDC, configured according to any of the previously described PDC embodiments, may be affixed to the bit body 802. With reference to FIG. 9, each of a plurality of PDCs 812 is secured to the blades 804 of the bit body 802 (FIG. 8). For example, each PDC 812 may include a PCD table 814 bonded to a substrate 816. More generally, the PDCs 812 may comprise any PDC disclosed herein, without limitation.

In addition, if desired, in some embodiments, a number of the PDCs 812 may not have been partitioned as described herein. Also, circumferentially adjacent blades 804 define so-called junk slots 820 therebetween. Additionally, the rotary drill bit 800 includes a plurality of nozzle cavities 818 for communicating drilling fluid from the interior of the rotary drill bit 800 to the PDCs 812.

FIGS. 8 and 9 merely depict one embodiment of a rotary drill bit that employs at least one PDC in accordance with the disclosed embodiments, without limitation. The rotary drill bit 800 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

The PDCs including one or more partitioning cuts according to embodiments disclosed herein may also be utilized in applications other than cutting technology. For example, the disclosed PDC embodiments may be used in bearings or other articles of manufacture including at least one PCD table or compact.

Figure 10:
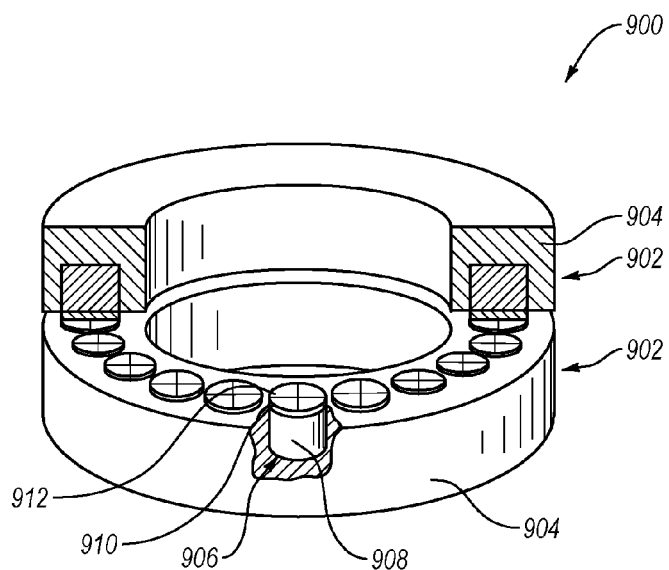
FIG. 10 is an isometric cut-away view of an embodiment of a thrust-bearing apparatus that may employ one or more PDCs according to any of the disclosed embodiments.

FIG. 10 is an isometric cut-away view of an embodiment of a thrust-bearing apparatus 900, which may utilize any of the disclosed PDC embodiments as bearing elements. The thrust-bearing apparatus 900 includes respective thrust-bearing assemblies 902. Each thrust-bearing assembly 902 includes an annular support ring 904 that may be fabricated from a material, such as carbon steel, stainless steel, or another suitable material. Each support ring 904 includes a plurality of recesses (not labeled) that receives a corresponding bearing element 906. Each bearing element 906 may be mounted to a corresponding support ring 904 within a corresponding recess by brazing, press-fitting, using fasteners, or another suitable mounting technique. One or more, or all of bearing elements 906 may be partitioned according to any of the disclosed embodiments. For example, each bearing element 906 may include a substrate 908 and a PCD table 910, with the PCD table 910 including a bearing surface 912.

In use, the bearing surfaces 912 of one of the thrust-bearing assemblies 902 bears against the opposing bearing surfaces 912 of the other one of the bearing assemblies 902. For example, one of the thrust-bearing assemblies 902 may be operably coupled to a shaft to rotate therewith and may be termed a "rotor." The other one of the thrust-bearing assemblies 902 may be held stationary and may be termed a "stator."

Figure 11:
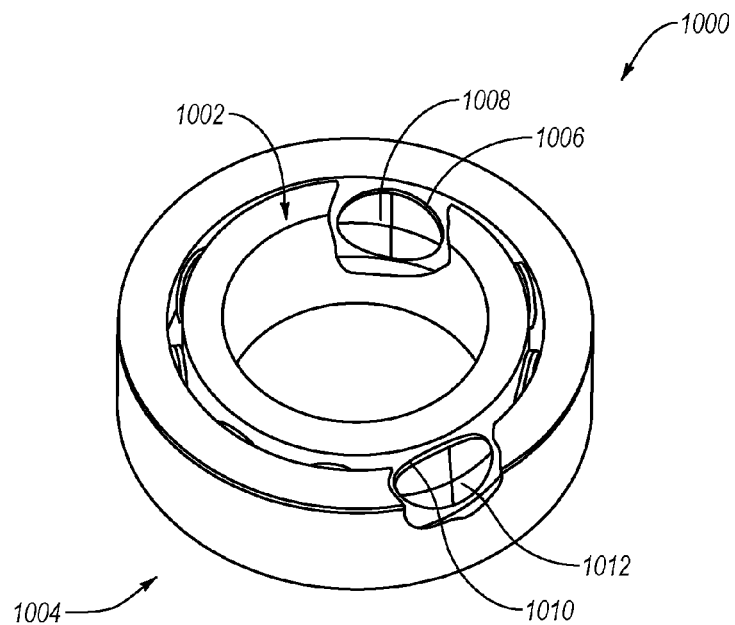
FIG. 11 is an isometric cut-away view of an embodiment of a radial bearing apparatus that may employ one or more PDCs according to any of the disclosed embodiments.

FIG. 11 is an isometric cut-away view of an embodiment of a radial bearing apparatus 1000, which may employ PDCs that have been partitioned according to any of the disclosed embodiments. The radial bearing apparatus 1000 includes an inner race 1002 positioned generally within an outer race 1004. The outer race 1004 includes a plurality of bearing elements 1006 mounted thereto that have respective bearing surfaces 1008. For such a radial bearing, the bearing surface 1008 of elements 1006 mounted to outer race 1004 may be concavely curved. The inner race 1002 also includes a plurality of bearing elements 1010 affixed thereto that have respective bearing surfaces 1012. For such a radial bearing, the bearing surface 1012 of elements 1010 mounted to inner race 1002 may be convexly curved to mate with the concave curvature of bearing surface 1008. One or more, or all of the bearing elements 1006 and 1010 may be partitioned according to any of the embodiments disclosed herein. The inner race 1002 is positioned generally within the outer race 1004 and, thus, the inner race 1002 and outer race 1004 may be configured so that the bearing surfaces 1008 and 1012 may at least partially contact one another and move relative to each other as the inner race 1002 and outer race 1004 rotate relative to each other during use.

The radial-bearing apparatus 1000 may be employed in a variety of mechanical applications. For example, so-called "roller cone" rotary drill bits may benefit from a radial-bearing apparatus disclosed herein. More specifically, the inner race 1002 may be mounted to a spindle of a roller cone and the outer race 1004 may be mounted to an inner bore formed within a cone and that such an outer race 1004 and inner race 1002 may be assembled to form a radial-bearing apparatus.

Figure 12:
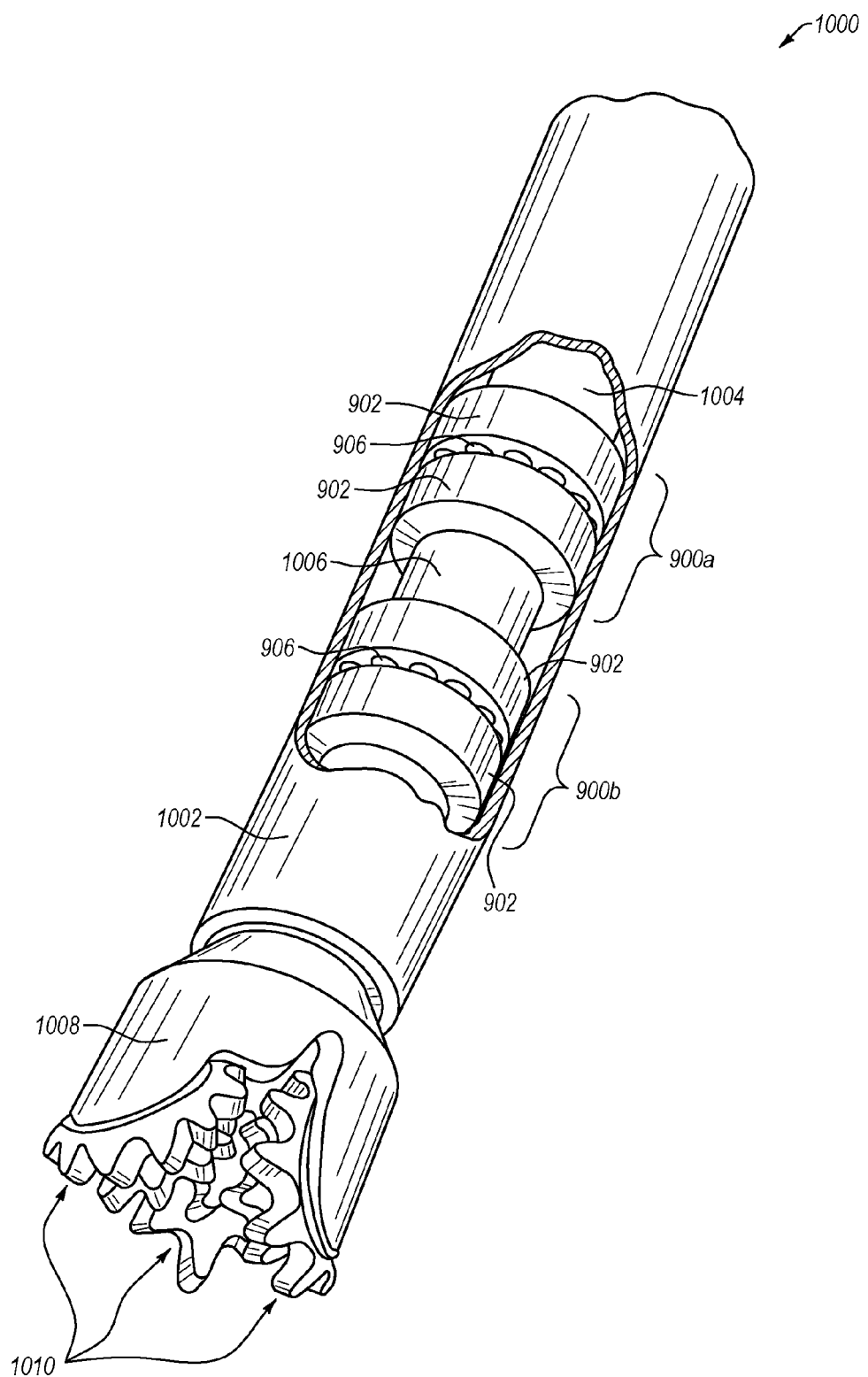
FIG. 12 is a schematic isometric cut-away view of an embodiment of a subterranean drilling system including the thrust-bearing apparatus shown in FIG. 10.

Referring to FIG. 12, the thrust-bearing apparatus 900 and/or radial bearing apparatus 1000 may be incorporated in a subterranean drilling system. FIG. 12 is a schematic isometric cut-away view of a subterranean drilling system 1100 that includes at least one of the thrust-bearing apparatuses 900 shown in FIG. 10 according to another embodiment. The subterranean drilling system 1100 includes a housing 1102 enclosing a downhole drilling motor 1104 (i.e., a motor, turbine, or any other device capable of rotating an output shaft) that is operably connected to an output shaft 1106. A first thrust-bearing apparatus 900*a* (FIG. 10) is operably coupled to the downhole drilling motor 1104. A second thrust-bearing apparatus 900*b* (FIG. 10) is operably coupled to the output shaft 1106. A rotary drill bit 1108 configured to engage a subterranean formation and drill a borehole is connected to the output shaft 1106. The rotary drill bit 1108 is shown as a roller cone bit including a plurality of roller cones 1110.

However, other embodiments may employ different types of rotary drill bits, such as a so-called "fixed cutter" drill bit shown in FIGS. 8-9. As the borehole is drilled, pipe sections may be connected to the subterranean drilling system 1100 to form a drill string capable of progressively drilling the borehole to a greater depth within the earth.

A first one of the thrust-bearing assemblies 902 of the thrust-bearing apparatus 900*a* is configured as a stator that does not rotate and a second one of the thrust-bearing assemblies 902 of the thrust-bearing apparatus 900*a* is configured as a rotor that is attached to the output shaft 1106 and rotates with the output shaft 1106. The on-bottom thrust generated when the drill bit 1108 engages the bottom of the borehole may be carried, at least in part, by the first thrust-bearing apparatus 900*a*. A first one of the thrust-bearing assemblies 902 of the second thrust-bearing apparatus 900*b* is configured as a stator that does not rotate and a second one of the thrust-bearing assemblies 902 of the thrust-bearing apparatus 900*b* is configured as a rotor that is attached to the output shaft 1106 and rotates with the output shaft 1106. Fluid flow through the power section of the downhole drilling motor 1104 may cause what is commonly referred to as "off-bottom thrust," which may be carried, at least in part, by the second thrust-bearing apparatus 900*b*.

In operation, drilling fluid may be circulated through the downhole drilling motor 1104 to generate torque and effect rotation of the output shaft 1106 and the rotary drill bit 1108 attached thereto so that a borehole may be drilled. A portion of the drilling fluid may also be used to lubricate opposing bearing surfaces of the bearing elements 906 of the thrust-bearing assemblies 902.

Thus, PDCs including one or more partitioning cuts as disclosed herein may be used in any apparatus or structure in which at least one PDC is typically used. In an embodiment, a rotor and a stator, assembled to form a thrust-bearing apparatus, may each include one or more PDCs (e.g., the PDC of FIG. 3) configured according to any of the embodiments disclosed herein and may be operably assembled to a downhole drilling assembly. U.S. Pat. Nos. 4,410,054; 4,560,014; 5,364,192; 5,368,398; 5,480,233; 7,552,782; and 7,559,695, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of at least partially relieving residual stresses within a polycrystalline diamond ("PCD") table of a polycrystalline diamond compact ("PDC"), the method comprising:
providing a PDC including a PCD table bonded to a substrate, wherein the PCD table includes a plurality of bonded diamond grains and the substrate is formed from a single cemented carbide material; and
partitioning at least the substrate of the PDC by forming a cut through an entire thickness of the substrate.

2. The method of claim 1 further comprising partitioning the PCD table of the PDC by forming a cut into at least a portion thereof.

3. The method of claim 2 wherein partitioning at least the substrate of the PDC comprises partitioning the substrate into at least two portions.

4. The method of claim 2 wherein the partition extends into the PCD table.

5. The method of claim 2 wherein the partitioning is achieved by grinding, machining, laser cutting, electro-discharge machining, or combinations thereof to remove material of the substrate to form at least one partition.

6. The method of claim 1, wherein the single cemented carbide material includes tungsten carbide, tantalum carbide, vanadium carbide, niobium carbide, chromium carbide, titanium carbide, or combinations thereof.

7. The method of claim 1, further comprising leaching at least a portion of the PCD table.

8. A method of at least partially relieving residual stresses within a polycrystalline diamond ("PCD") of a polycrystalline diamond compact ("PDC"), the method comprising:
providing a PDC including a single layer of PCD bonded to a substrate and defining a PCD table, wherein the PCD table includes a plurality of bonded diamond grains; and
partitioning at least the PCD table of the PDC by forming a cut at least a majority of the way through a thickness of the PCD table and into at least a portion of the substrate.

9. The method of claim 8 wherein partitioning at least the PCD table of the PDC comprises partitioning the PCD table into at least two portions.

10. The method of claim 8 wherein the partition extends into at least a portion of a cobalt-depleted zone of the substrate adjacent to the PCD table.

11. The method of claim 10 wherein the partition extends beyond a cobalt-depleted zone of the substrate.

12. The method of claim 8, further comprising forming a spring mechanism in the substrate that is configured to allow the PCD table to flex and absorb energy as a result of an impact.

13. The method of claim 8, wherein the plurality of bonded diamond grains includes at least a single modal diamond particle size distribution.

14. The method of claim 8, further comprising leaching at least a portion of the PCD table.

15. A polycrystalline diamond compact ("PDC") comprising:
- a substrate formed from a single cemented carbide material;
- a single layer of polycrystalline diamond ("PCD") including a plurality of bonded diamond grains defining a PCD table, the PCD table being bonded to the substrate and including an exterior working surface and at least one lateral surface; and
- at least one stress relieving partition, formed into at least the substrate, which extends at least a majority of the way through a thickness of the substrate or the PCD table, respectively, to at least partially relieve stresses within the PCD table.

16. The PDC of claim 15, further comprising a spring mechanism disposed within the substrate formed by removing a portion of the substrate that is configured to allow the PCD table to flex and absorb energy as a result of an impact.

17. The PDC of claim 16 wherein the spring mechanism comprises a plurality of substantially parallel relief cuts formed into the substrate, the relief cuts extending substantially parallel relative to a longitudinal axis of the PDC.

18. The PDC of claim 16 wherein the spring mechanism comprises a helically extending groove formed into the substrate.

19. The PDC of claim 16 wherein the spring mechanism comprises a circumferentially extending groove formed into the substrate.

20. The PDC of claim 15 wherein the at least one stress relieving partition is further formed in the PCD table.

21. The PDC of claim 20 wherein the partition extends in the PCD table to about 0.01 inch or less from the substrate.

22. The PDC of claim 20 wherein the partition extends in the PCD table to about 0.05 inch or less from the substrate.

23. The PDC of claim 20 wherein the partition has a width of about 0.001 inch to about 0.01 inch.

24. The PDC of claim 20 wherein the PCD table is domed.

25. The PDC of claim 15 wherein the partition in the substrate is at least partially filled with braze material.

26. The PDC of claim 15 wherein the at least one stress relieving partition comprises a plurality of stress relieving partitions.

27. The PDC of claim 15, wherein the single cemented carbide material includes tungsten carbide, tantalum carbide, vanadium carbide, niobium carbide, chromium carbide, titanium carbide, or combinations thereof; and wherein the plurality of bonded diamond grains includes at least a single modal diamond particle size distribution.

28. The PDC of claim 15 wherein at least a portion of the PCD table is at least partially leached.

29. A rotary drill bit, comprising:
- a bit body configured to engage a subterranean formation; and
- a plurality of polycrystalline diamond cutting elements mounted to the bit body, at least one of the plurality of polycrystalline diamond cutting elements including:
  - a substrate formed from a single cemented carbide material;
  - a single layer of polycrystalline diamond ("PCD") including a plurality of bonded diamond grains defining a PCD table, the PCD table being bonded to the substrate and including an exterior working surface and at least one lateral surface; and
  - at least one stress relieving partition, formed into at least the substrate, which extends at least a majority of the way through a thickness of the substrate.

30. The rotary drill bit of claim 29, wherein the single cemented carbide material includes tungsten carbide, tantalum carbide, vanadium carbide, niobium carbide, chromium carbide, titanium carbide, or combinations thereof; and wherein the plurality of bonded diamond grains includes at least a single modal diamond particle size distribution.

31. The rotary drill bit of claim 29 wherein at least a portion of the PCD table is at least partially leached.

32. A polycrystalline diamond compact, comprising:
- a substrate;
- a polycrystalline diamond ("PCD") table including a plurality of bonded diamond grains, the PCD table being bonded to the substrate and including an exterior working surface and at least one lateral surface; and
- at least one stress relieving partition, formed into at least one of the substrate or the PCD table, which extends at least a majority of the way through a thickness of the substrate or the PCD table, respectively, to at least partially relieve stresses within the PCD table, the at least one stress relieving partition exhibiting a width of about 0.001 inches to about 0.2 inches.

33. A polycrystalline diamond compact, comprising:
- a substrate;
- a polycrystalline diamond ("PCD") table including a plurality of bonded diamond grains, the PCD table being bonded to the substrate and including an exterior working surface and at least one lateral surface; and
- at least one stress relieving partition, formed into at least one of the substrate or the PCD table, which extends at least a majority of the way through a thickness of the substrate or the PCD table, respectively, to at least partially relieve stresses within the PCD table, the at least one stress relieving partition exhibiting a nonzero width.

* * * * *

UNITED STATES PATENT AND TRADEMARK OFFICE
CERTIFICATE OF CORRECTION

PATENT NO. : 8,950,519 B2  
APPLICATION NO. : 13/234252  
DATED : February 10, 2015  
INVENTOR(S) : Gonzalez et al.

Page 1 of 1

It is certified that error appears in the above-identified patent and that said Letters Patent is hereby corrected as shown below:

On Title Page 2, Item (56), Column 2, under "OTHER PUBLICATIONS", Line 18, delete "Graphitzation" and insert -- Graphitization --, therefor.

In the Claims

In Column 14, Claim 8, Line 43, delete "("PCD")" and insert -- ("PCD") table --, therefor.

Signed and Sealed this  
Seventh Day of July, 2015

Michelle K. Lee  
*Director of the United States Patent and Trademark Office*